(12) United States Patent
Denton

(10) Patent No.: US 8,407,240 B2
(45) Date of Patent: Mar. 26, 2013

(54) AUTONOMIC SELF-HEALING NETWORK

(75) Inventor: Guy S. Denton, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1507 days.

(21) Appl. No.: 11/324,869

(22) Filed: Jan. 3, 2006

(65) Prior Publication Data

US 2007/0157313 A1   Jul. 5, 2007

(51) Int. Cl.
*G06F 7/00* (2006.01)
*G06F 17/30* (2006.01)
*G06F 13/14* (2006.01)

(52) U.S. Cl. ........................................... 707/766

(58) Field of Classification Search .............. 707/5, 9, 707/705, 758–759, 765–766; 710/1; 711/147, 711/163; 715/716–726; 726/1–36; 705/22–44; 709/225–249
See application file for complete search history.

(56) References Cited

U.S. PATENT DOCUMENTS

| | | | |
|---|---|---|---|
| 6,236,996 B1 * | 5/2001 | Bapat et al. ........................... | 1/1 |
| 6,718,328 B1 * | 4/2004 | Norris ........................... | 709/229 |
| 6,792,461 B1 | 9/2004 | Hericourt | |
| 6,823,454 B1 | 11/2004 | Hind et al. | |
| 6,941,472 B2 * | 9/2005 | Moriconi et al. ............... | 726/11 |
| 2003/0051170 A1 | 3/2003 | Spearman | |
| 2004/0054926 A1 | 3/2004 | Ocepek et al. | |
| 2004/0117657 A1 | 6/2004 | Gabor et al. | |
| 2004/0176023 A1 | 9/2004 | Linder et al. | |
| 2005/0210291 A1 * | 9/2005 | Miyawaki et al. ............ | 713/201 |
| 2006/0005254 A1 * | 1/2006 | Ross ............................... | 726/27 |
| 2006/0178954 A1 * | 8/2006 | Thukral et al. ................. | 705/28 |
| 2006/0242701 A1 * | 10/2006 | Black et al. ..................... | 726/22 |
| 2006/0265408 A1 * | 11/2006 | Pini .............................. | 707/100 |
| 2006/0272014 A1 * | 11/2006 | McRae et al. .................. | 726/12 |
| 2007/0143471 A1 * | 6/2007 | Hicks et al. .................... | 709/224 |
| 2007/0147318 A1 * | 6/2007 | Ross et al. ..................... | 370/338 |

\* cited by examiner

*Primary Examiner* — Usmaan Saeed
*Assistant Examiner* — Cecile Vo
(74) *Attorney, Agent, or Firm* — Matthew Chung; Roberts Mlotkowski Safran & Cole, P.C.

(57) ABSTRACT

A system and method capable of obtaining information dynamically of assets residing on a network. The system and method further capable of comparing a device identifier to the dynamically obtained information of assets and policies at a time of a request to access the network and determining whether the device identifier matches at least one of the dynamically obtained information of assets and policies. The system and method further capable of quarantining the device from the network or a portion thereof based upon the determining.

37 Claims, 3 Drawing Sheets

AUTONOMIC SELF-HEALING NETWORK

FIELD OF THE INVENTION

The invention generally relates to computer network security and, more particularly, to an autonomic response to a perceived computer network security breach.

BACKGROUND DESCRIPTION

Computer networks, such as corporate Local Area Networks (LANs), are vulnerable to being compromised by both unauthorized and authorized clients. Although an unauthorized client poses a clear threat of malice, an authorized client may also compromise the network, for example, if the client is infected with a virus, invaded by spyware or other tracking threat, running software that is not up-to-date, or performing unauthorized actions. This vulnerability is present in both wired and wireless networks. The consequences of such vulnerabilities range in magnitude from the trivial—such as unauthorized clients tapping in to the network for free Internet access, corruption of files, and abuse of bandwidth—to the monumental—such as the large-scale theft of personal and financial information.

Efforts have been made to manage computing environments by keeping track of and upgrading computer equipment and various levels of operating systems and applications. To this end, tools exist for auditing a network in order to determine the existence and status of both hardware and software such as the number of systems, the existence of patches, and the versions of software. Such audits can be continuous, for example by use of a daemon. Alternatively, an audit can take just a snapshot of the then-existing state of the network. Such audits can be active, for example by broadcasting queries, or passive, for example by sitting on a network switch and "sniffing," gathering information from passing network traffic. These efforts, though, do not control access to the network. At best they can identify a problem.

Other current preventative measures include software and hardware devices that attempt to control access to the network by, for example, denying access to unauthorized clients, denying access to authorized clients without current software, and denying requests from clients that exceed the client's authority.

Existing solutions also include certain standards, such as the IEEE 802.1X standard, designed to enhance the security of networks such as Ethernet, Token Ring, or wireless LANs. Such standards segment unauthenticated clients or network devices to a virtual LAN (VLAN) during the process of authentication, effectively quarantining the unauthorized user. Numerous authentication mechanisms exist, such as token cards, smart cards, certificates, one-time passwords, and public key encryption authentication. While in such a quarantined state, the client has the ability only to send information concerning its identity to an authentication server.

Certain other limited solutions exist that are more automated than the above-described solutions. For example, patch management software is available that will automatically check the existing version of a software patch when a client logs on to the network, and install the most current patch if appropriate. Additionally, anti-virus software is available that will automatically check the existing version of a client's anti-virus software upon logon to the network, and update to the current version if necessary. Also, devices and software such as a firewall can eliminate or limit clients' ability to perform certain functions, such as instant messaging, streaming video, or streaming audio.

These solutions are costly and insufficient, though, in several ways. For example, they each apply only to one discrete vulnerability of the network. Additionally, an individual network administrator's ad hoc policy decisions may differ from the corporation's stated policy, for example, a network administrator might give a co-worker privileges to download music via the corporate network even though such action is prohibited by corporate policy. Moreover, the above solutions are a patchwork attempt to perform a critical function. There may be both known and unknown holes in the patchwork, exposing the network to threats from all sides.

Thus it is desirable to achieve improved overall network security and control.

SUMMARY OF THE INVENTION

In a first aspect of the invention a method comprises obtaining information dynamically of assets residing on a network. The method further includes comparing a device identifier to the dynamically obtained information of assets and policies at a time of a request to access the network, and determining whether the device identifier matches at least one of the dynamically obtained information of assets and policies. The method further includes quarantining the device from the network or a portion thereof based upon the determining step.

In a second aspect of the invention a method comprises receiving a request for access to a network from a device and verifying whether the device is known by querying an assets database and whether the request complies with a rule set by querying a policy database. The method further includes denying access to the network or portions thereof based upon whether the device is known and complies with the rule set, and quarantining the device to a virtual network or segment thereof based upon the denied access.

In a third aspect of the invention a system, which can be computer implemented or otherwise, capable of obtaining information dynamically of assets residing on the network, comparing a device identifier to the dynamically obtained information of assets and policies at a time of a request to access the network, determining whether the device identifier matches at least one of the dynamically obtained information of assets and policies, and quarantining the device from the network or a portion thereof based upon the determination.

In a fourth aspect of the invention a computer program product which can be implemented on computer hardware or software for controlling access to a computer network comprises obtaining information dynamically of assets residing on a network and comparing a device identifier to the dynamically obtained information of assets and policies at a time of a request to access the network. The computer program product further includes determining whether the device identifier matches at least one of the dynamically obtained information of assets and policies and quarantining the device from the network or a portion thereof based upon the determining.

DETAILED DESCRIPTION OF EMBODIMENTS OF THE INVENTION

The invention is generally directed to a system and method of controlling access to a computer network, and more particularly to providing an autonomic response to a perceived breach of security. The autonomic response improves overall network security and control by authorizing access to the network for known devices, by uniformly applying policy restrictions, and by segmenting unauthorized devices into one or more Virtual Local Area Networks (VLANs) until authorization can be resolved.

The invention allows access control to a network which is both policy controlled based on pre-defined security constraints as well as self healing for systems which are not policy controlled. In implementation, access to a network is based on known topologies by using self-discovery methods to mine for new or modified network assets and building a database that includes all such network assets. To maintain the network at the optimum level of security, the system and method monitors and grants access based on pre-defined criteria, and on a dynamic basis. This allows the system to constantly monitor the network to determine and reconcile previously unknown assets (e.g. existing servers and clients, as well as "stolen or borrowed" IP addresses, etc.) and provide increased security.

To implement the system and method of the invention, in one embodiment, segmentation based on pre-defined policies, and segmentation of servers based on pre-defined requirements can be used to complement basic network-based discovery techniques. Tracking computing devices as assets, both clients and servers, and by controlling their usage helps in the provision and maintenance of an efficient, optimized service. When combining these together, the segmentation can require specific software policies for clients, servers can be located with network discovery tools based on Internet Control Message Protocol (ICMP) echo or known service ports linked to server-based access control for monitoring pre-defined required software where servers do not support solutions such as, for example, 802.1X. By applying the policy database against the assets database, the combined information from network discovery, 802.1X client control, network port allocations and/or server IP's can be used to compute the layout of an aggregate picture of assets based on such policies and can be utilized to increase network security.

SYSTEM OF THE INVENTION

Figure 1:
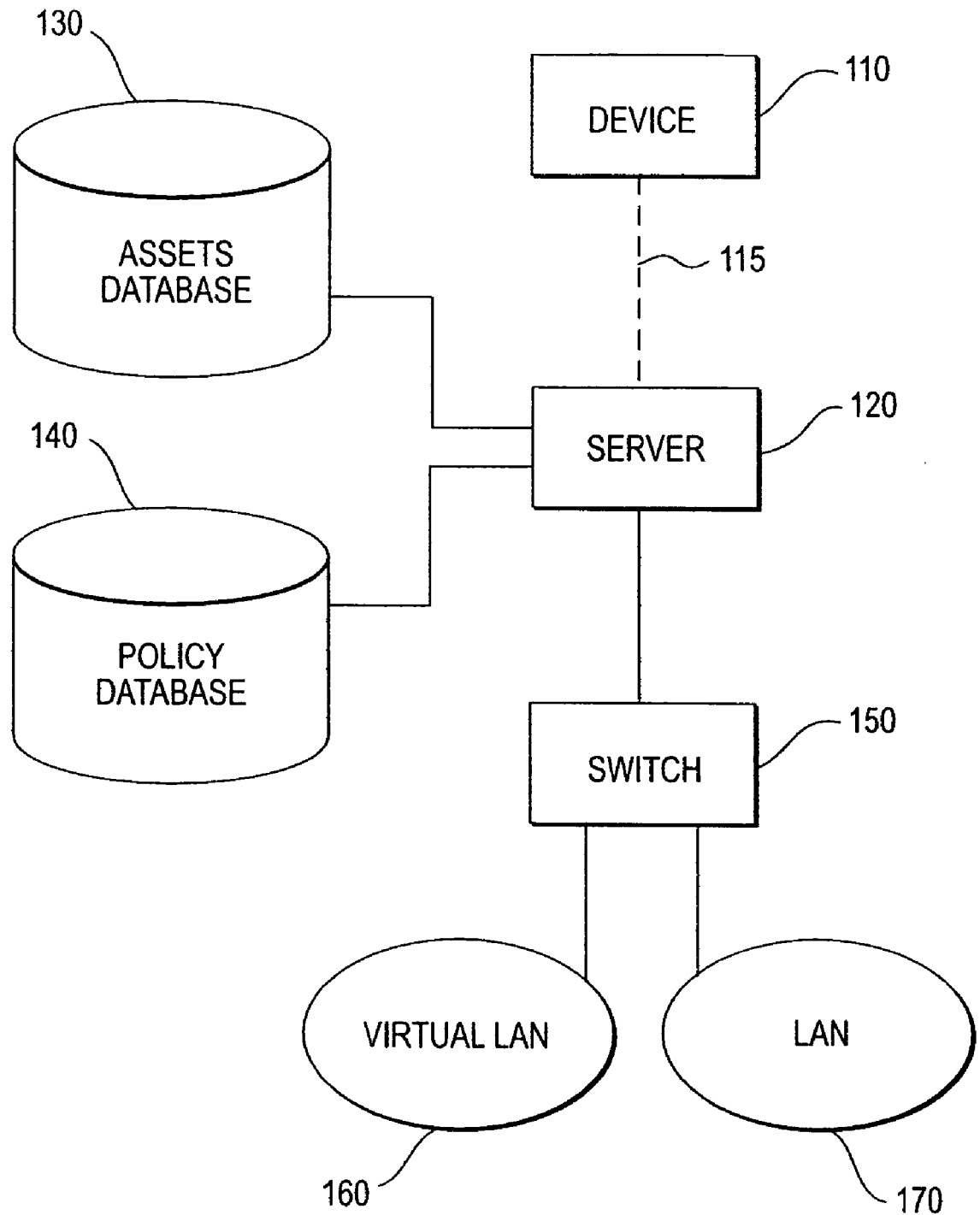
FIG. 1 is a block diagram of the environment of an embodiment of the invention.

FIG. 1 is a block diagram of an environment of the invention, generally denoted by reference numeral 100. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The configuration of the invention can be implemented in the environment of FIG. 1. For example, the invention can reside on a server 120; although it is contemplated that the invention can run on any of the components of FIG. 1 or run with any of the components of FIG. 1.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). A computer-readable medium includes a semiconductor or solid state memory, magnetic tape, a removable computer diskette, a random access memory (RAM), a read-only memory (ROM), a rigid magnetic disk or an optical disk. Current examples of optical disks include compact disk-read only memory (CD-ROM), compact disk-read/write (CD-RAN) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Being more specific and referring to FIG. 1, the invention includes at least one computer network device 110 (e.g., a client, workstation, server, or wireless device), which typically has a memory device (e.g., a hard drive, DVD drive, or the like) with processing capability and accompanying hardware and/or software, well-known to those of skill in the art. The device 110 may be connected via a network 115 (e.g., a local area network (LAN), a wide area network (WAN), wireless network (WLAN), or the Internet) to one or more servers 120. For illustrative purposes, the server 120 is representative of content sources which one of ordinary skill in the art would recognize may be any number of servers and may be different content sources such as, for example, DB2 databases, Web sites, or the like.

The server 120 may have access to an assets database 130 and a policy database 140. It should be understood by those of skill in the art that the assets database 130 and policy database 140 may also reside directly on the server 120. The server 120 may also be connected to one or more switches 150 which may switch a device to a VLAN 160 or a LAN 170, depending on particular criteria as discussed herein.

Ongoing Network Discovery

In one embodiment, the assets database 130 contains information regarding the assets associated with the networked system. In one implementation, the assets database 130 performs ongoing discovery of the assets connected to the network; that is the assets database 130 is populated with information gained though network discovery. This ongoing discovery may be either continuous or periodic, and may be either active or passive (or a combination of both active and passive), all well known to those of skill in the art. Active network discovery includes methods such as, for example, broadcasting a ping packet querying the network assets to respond. Passive network discovery includes methods such as, for example, "sniffing," a daemon, or residing on a switch and listening to network traffic to identify assets.

During such ongoing network discovery, the assets database 130 may, for example, audit the network to determine what assets (e.g. servers, clients, wireless devices) are associated with the networked system. In this way, the assets database 130 is continuously or periodically updated to reflect the current state of the network assets. The assets database 130 may be populated and installed on systems based on existing software protocols such as Tivoli allo™. The information populating the assets database 130 may be any appropriate identifier.

The assets database 130 may include identifying information regarding a device on the network. The device may be, for example, a client, a server, a workstation, or a wireless device. For example, the identifying information for a device may include:

- the version of the operating system;
- the IP address;
- the version(s) of the patch(es);
- the Media Access Control (MAC) address of the server;
- the owner of the server;
- whether the server is authorized to access the network;
- the security settings on the wireless device;
- a service set identifier (SSID);
- an extended service set identifier (ESSID);
- whether the wireless device is authorized to access the network;
- whether antivirus software is installed and current; and
- whether certain services are enabled.

Policy Requirements

In one implementation of the invention the policy database 140 contains at least one rule set and/or policies regarding authorization to access the network or portions thereof. The policy database 140 may include information—such as the minimum version of the operating system, the minimum patch level, the minimum software version, the wireless requirements, the client requirements, and the service requirements—below which or without which access to the network will not be granted.

For example, the policy database 140 might be as simple as a rule that all software patches must be updated at least weekly; or that encrypted communications are not allowed. The policy database 140 may also dictate the consequences of certain violations of the rule(s), for example, if the device 110 does not have the most current version of a software patch, the device 110 might be sent a warning such that after two such warnings, the device 110 may be denied access. The policy database 140 may also include information such as a list of authorized services, or a list of unauthorized services (e.g., instant messaging, streaming video, streaming audio), (or a list of both authorized and unauthorized services), which may be used to ensure that access to the network is not authorized for a particular use.

Client-Based Discovery and Verification

In general, upon receiving a request for access to the network from a device 110, the server may verify whether the device 110 is known, by querying the assets database 130. The server 120 may also verify whether the request complies with the rule set by querying the policy database 140. If the device 110 is not known, or if the request violates a policy, the device 110 is denied access to the networked system or portions thereof, and will be quarantined by the request being directed to the VLAN 160. If the device 110 is known, and the request does not violate a policy, then the device 110 is granted access to the LAN 170.

Autonomic Self Healing

In a further embodiment of the invention, the network self-discovery continues. Newly installed or modified devices are listed in the assets database as discovered. Unknown assets, or those not meeting the requirements of the policy database, are quarantined until they can authenticate or verify compliance. Thus, a device is only granted an IP address and authorized access to the network if it can prove it is both known and in compliance. This would allow autonomic self healing as should be understood by those of skill in the art.

ILLUSTRATIVE EXAMPLES OF THE SYSTEM

Figure 2:
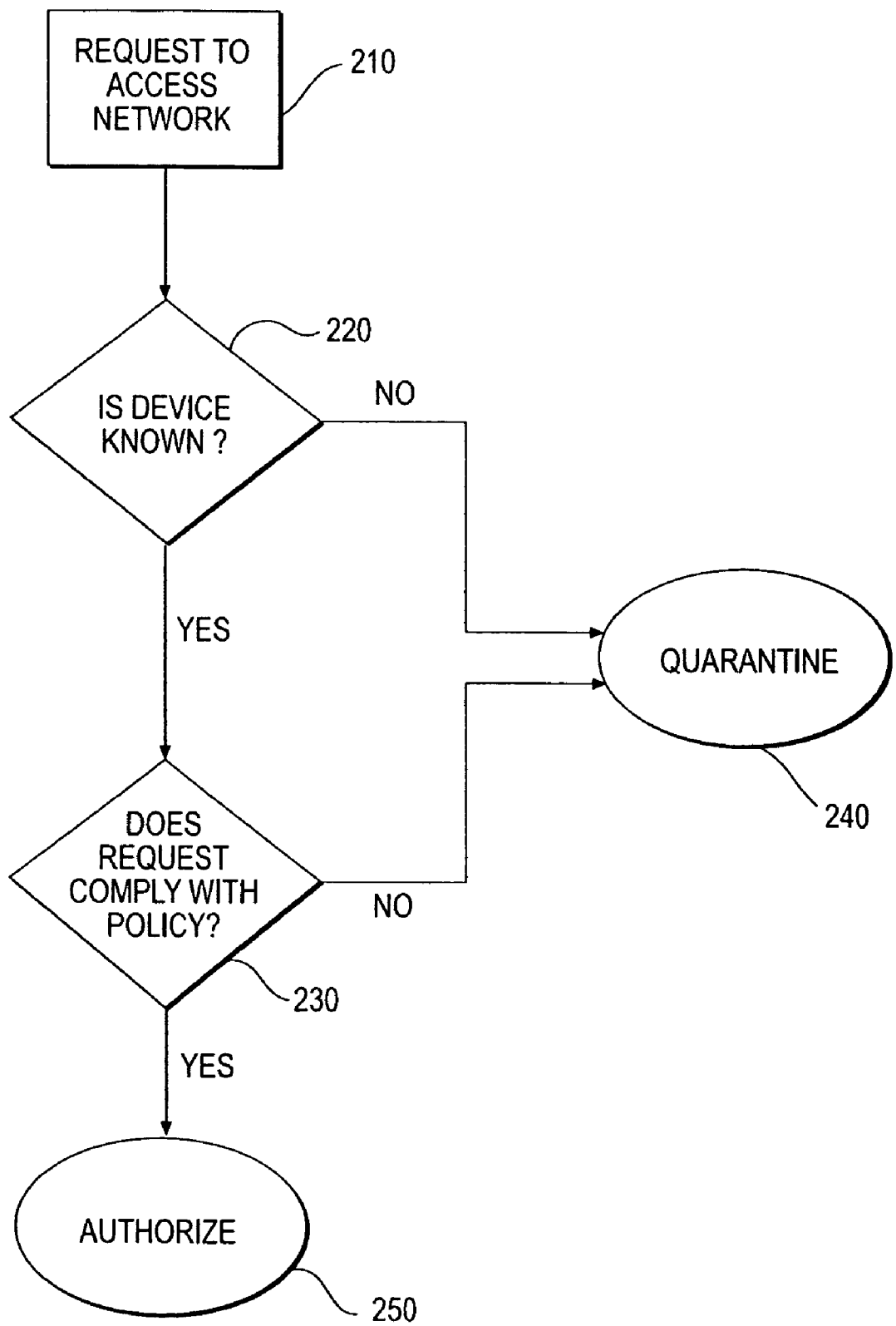
FIG. 2 is a flow diagram of an embodiment of the invention.

FIG. 2 is a flow diagram of an embodiment of the invention, generally denoted by reference numeral 200. FIG. 2 (as well as any remaining flow diagrams) may also be representative of a high-level block diagram showing a high level system of the invention. The steps of FIG. 2 (as well as any flow diagrams described herein) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The computer readable code may be combined with the appropriate hardware and/or computing platform (which may be distributed software and hardware components, either new or pre-existing) for executing certain steps of the invention.

As shown in FIG. 2, at step 210, the device transmits to the server a request to access the network. At step 220, the server determines whether the device 110 is known (e.g., the identifying information of the device is matched to an asset in the assets database). If the device is not known, at step 240, the device is sent to a switch for quarantine in a VLAN. It should be understood there could be one or more VLANs, and that any of the one or more VLANs could be segmented into additional VLANs. Depending on the level of quarantine, the device request can be sent to a particular VLAN or segment of a VLAN, as described further.

If the device is known (e.g., the identifying information of the device is matched to an asset in the assets database), at step 230, the server determines whether the request complies with the requirements of a policy database. If the request does not comply with the requirements of the policy database, at step 240, the device is sent to a switch which quarantines the device in a particular VLAN or a segment of the VLAN, depending on the level of quarantine. If the request does comply with the requirements of the policy database, at step 250, the device is sent to a switch, which authorizes access to the network. As such, the device now can gain access to the network or portions thereof, depending on the access granted.

Figure 3:
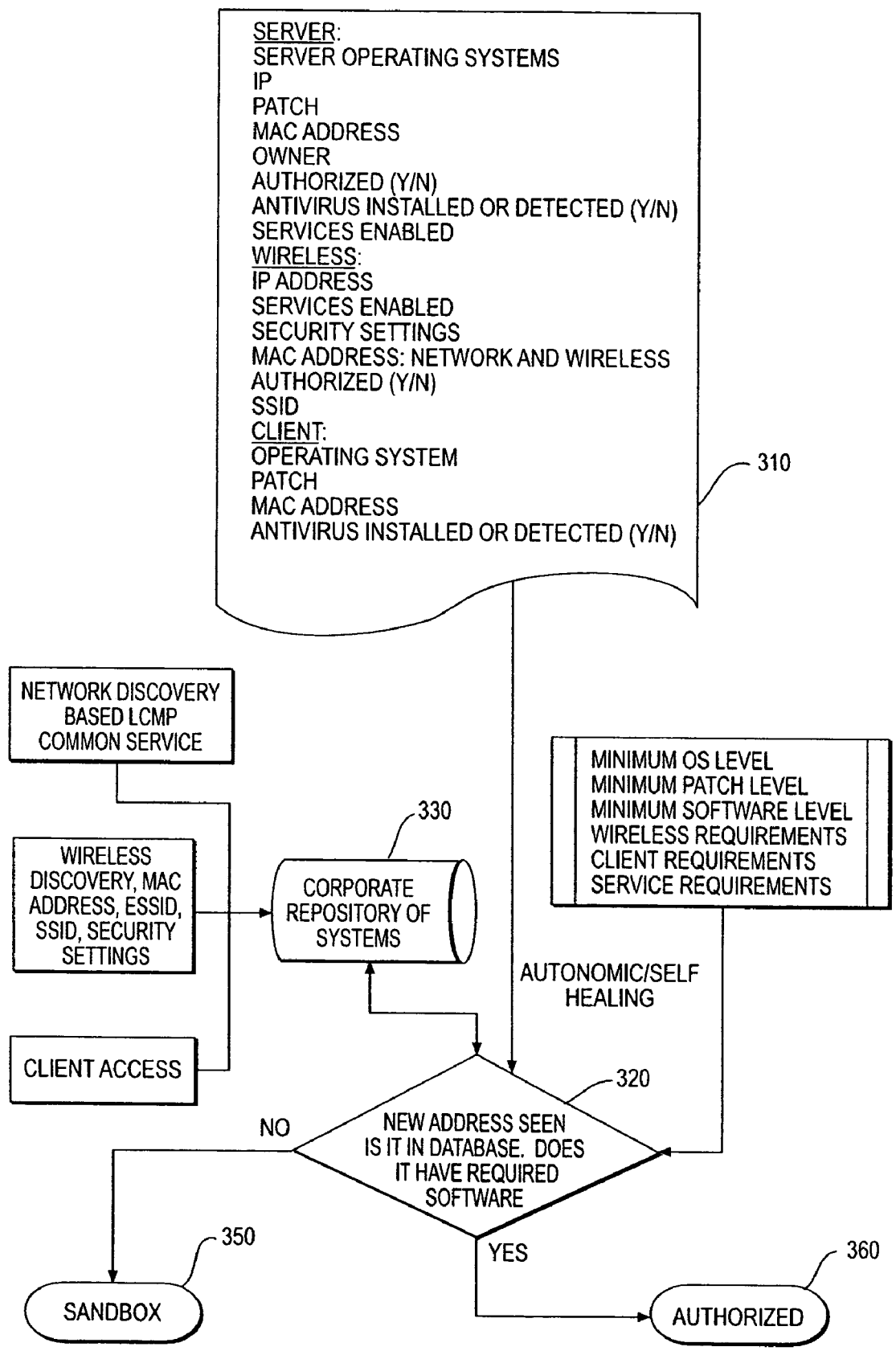
FIG. 3 is a block diagram of an embodiment of the invention.

Being more specific, FIG. 3 is a block diagram of an embodiment implementing steps of using the invention, generally denoted by reference numeral 300. In FIG. 3, the invention includes at least one computer network device 310. The device 310 may be a server, client, or wireless device for example. The identifying information resident on this device 310 may include:

- an operating system;
- an IP address;
- a software patch;
- a Media Access Control (MAC) address;
- anti-virus software;
- security settings;
- a service set identifier (SSID); and
- an extended service set identifier (ESSID), to name but a few.

In one embodiment of the invention, the device 310 sends to a server 320 a request to access the network. The server 320 may query a corporate repository of systems 330 to determine whether the device 310 is listed in the corporate repository 330. It should be understood that the corporate repository 330 may or may not be resident on the server 320, which is not critical to understanding the invention. If the identifier of the device 310 is not matched in the corporate repository 330, the device is not granted access to the network, and is directed to one of one or more sandboxes 350 (e.g. VLAN). At this stage the request is quarantined at one or more different levels and may be allowed or denied access to different portions of the network. Thus the sandbox 350 is segmented or quarantined from the network 360 such that the device 310 cannot come in contact with any networked devices from which it may have been quarantined such that damage thereto (e.g., exposure to virus, theft of information, hijacking of Internet access) may be limited or eliminated.

The server may query a list of requirements 340 to determine whether the device 310 meets the minimum requirements necessary to access the network, e.g., rule sets. If the device 310 does not meet the minimum requirements necessary to access the network, the device may be granted limited or no access to the network, and is directed to a sandbox 350. If the device 310 is listed in the corporate repository 330 and meets the minimum requirements necessary to access the network, access to the authorized portion of the network 360 is granted.

Although the above steps of FIGS. 2 and 3 are described in a particular order, it should be understood that no order is necessarily implied. Rather, these steps may be performed either simultaneously, or in another order.

In an example implementing the invention, it should be understood that the sandbox 350 could be one or more VLANs, and that any of the one or more sandboxes 350 could be segmented into additional sandboxes 350. Depending on the level of quarantine, the device request can be sent to a particular sandbox 350 or segment of a sandbox 350. For example, if the device cannot authenticate, it may be sent to sandbox A (or segment A of the sandbox 350). Alternatively, if the device can authenticate, but is not at the required operating system level, it is sent to sandbox B (or segment B of the sandbox 350). Or, if the device can authenticate and is at the required operating system level, but is not at the required anti-virus level, it is sent to sandbox C (or segment C of the sandbox 350). As a final example, if the device can authenticate and is at the required operating system level and the required anti-virus level, but unauthorized services are seen, such as music sharing, it is sent to sandbox D (or segment D of the sandbox 350).

While the present invention has been described in terms of embodiments, those skilled in the art will recognize that the invention can be practices with modifications and in the spirit and scope of the appended claims.

What is claimed is:

1. A method comprising:
    obtaining information dynamically of assets residing on a network by discovering the assets connected to the network, populating an assets database, and performing ongoing monitoring of the network to determine and reconcile previously unknown assets;
    comparing a device identifier to the dynamically obtained information of assets at a time of a request to access the network;
    determining that the device identifier matches the dynamically obtained information of assets;
    determining that the assets comply with one or more rules at the time of the request to access the network, wherein access to the network is permitted only after the determining steps; and
    quarantining a device from the network or a portion thereof based upon one or more of the determining steps.

2. The method of claim 1, wherein the quarantining step comprises directing the device to a segmented portion of the network.

3. The method of claim 2, wherein the segmented portion is based upon pre-defined policies and known assets to the network.

4. The method of claim 1, wherein the quarantining step comprises switching the device to a virtual network.

5. The method of claim 1, further comprising resolving authorization of the quarantined device.

6. The method of claim 1, wherein the obtaining step comprises performing ongoing discovery of assets connected to the network to populate an assets database.

7. The method of claim 6, wherein the ongoing discovery is performed either continuously or periodically.

8. The method of claim 6, wherein the ongoing discovery is performed actively or passively.

9. The method of claim 1, further comprising authorizing access to the network based upon a match between the device identifier and at least one of the dynamically obtained information of assets and policies.

10. The method of claim 9, wherein the authorizing step comprises granting limited access to the network.

11. The method of claim 9, wherein the authorizing step comprises granting access to a portion of the network.

12. The method of claim 1, further comprising providing a warning based upon certain violations of the policies.

13. The method of claim 1, further comprising querying a policy database to obtain the one or more rules.

14. The method of claim 13, wherein the ongoing monitoring is configured to detect existing servers, clients, and one of stolen or borrowed Internet Protocol (IP) addresses.

15. The method of claim 14, wherein the quarantine persists until the device identifier matches the dynamically obtained information of assets and/or the assets comply with the one or more rules.

16. The method of claim 1, wherein the device identifier comprises a version of an operating system; an IP address; a version of at least one patch; a Media Access Control (MAC) address of a server; an owner of the server; whether the server is authorized to access the network; a security settings on a wireless device; a service set identifier (SSID); an extended service set identifier (ESSID); whether the wireless device is authorized to access the network; whether an antivirus software is installed and current; and whether certain services are enabled.

17. A method comprising:
    receiving a request for access to a network from a device;
    verifying whether the device is known by querying an assets database;
    verifying whether the request complies with a rule set by querying a policy database;
    granting access to the network or portions thereof only when the device is known and complies with the rule set;
    quarantining the device to a virtual network or segment thereof based upon the denied access; and
    obtaining information dynamically of assets residing on the network by ongoing monitoring of the network to determine and reconcile previously unknown assets, wherein the ongoing monitoring is configured to detect existing servers, clients, and one of stolen or borrowed Internet Protocol (IP) addresses.

18. The method of claim 17, wherein the segmented portion is based upon pre-defined policies and known assets to the network.

19. The method of claim 17, wherein the quarantining step comprises switching the device to a virtual network.

20. The method of claim 17, further comprising resolving authorization of the quarantined device.

21. The method of claim 17, wherein the obtaining step comprises performing ongoing discovery of assets connected to the network to populate the assets database.

22. The method of claim 21, wherein the ongoing discovery is performed either continuously or periodically and is performed actively or passively.

23. The method of claim 17, further comprising comparing a device identifier of the device to assets which are dynamically obtained by the assets database.

24. The method of claim 23, wherein the quarantining step is based on the comparison of the device identifier to the assets.

25. The method of claim 23, further comprising authorizing access to the network based upon a match between the device identifier and at least one of the dynamically obtained information of assets and the rule sets.

26. The method of claim 25, wherein the authorizing step comprises granting limited access to the network.

27. The method of claim 25, wherein the authorizing step comprises granting access to a portion of the network.

28. The method of claim 17, further comprising providing a warning based upon certain violations of the rule sets.

29. The method of claim 17, wherein the policy database includes a minimum version of an operating system, a minimum patch level, a minimum software version, a wireless requirements, at least one client requirement, and at least one service requirement.

30. A system for quarantining devices on a network comprising:
means for obtaining information dynamically of assets residing on the network by discovering the assets connected to the network, populating an assets database, and performing ongoing monitoring of the network to determine and reconcile previously unknown assets;
means for comparing a device identifier to the dynamically obtained information of assets at a time of a request to access the network;
means for determining that the device identifier matches the dynamically obtained information of assets;
means for determining that the assets comply with one or more rules at the time of the request to access the network, wherein access to the network is permitted only after the device identifier is matched and the assets comply with the one or more rules; and
means for quarantining the device from the network or a portion thereof based upon one or more of the determinations;
wherein the means for obtaining, comparing, determining, and quarantining is embodied in one of a hardware environment and a combination of a software environment and a hardware environment.

31. The system of claim 30, wherein the means for quarantining comprises directing the device to a segmented portion of the network.

32. The system of claim 30, further comprising means for switching the device to a virtual network based on the determination.

33. The system of claim 30, further comprising means for resolving authorization of the quarantined device.

34. The system of claim 30, wherein the ongoing discovery is performed by one of continuously, periodically, actively and passively.

35. The system of claim 30, further comprising means for authorizing access to the network or a portion thereof based upon a match between the device identifier and at least one of the dynamically obtained information of assets and policies.

36. The system of claim 30, further comprising means for providing a warning based upon certain violations of the policies.

37. A computer program product comprising a computer useable storage medium including a computer readable program, wherein the computer readable program when executed on a computer causes the computer to:
obtain information dynamically of assets residing on a network by discovering the assets connected to the network, populating an assets database, and performing ongoing monitoring of the network to determine and reconcile previously unknown assets;
compare a device identifier to the dynamically obtained information of assets at a time of a request to access the network;
determine that the device identifier matches the dynamically obtained information of assets;
determine that the assets comply with one or more rules at the time of the request to access the network, wherein access to the network is permitted only after the device identifier is matched and the assets comply with the one or more rules; and
quarantine the device from the network or a portion thereof based upon one or more of the determining steps.

* * * * *